United States Patent Office 2,948,725
Patented Aug. 9, 1960

2,948,725
5-FLUOROOROTIC ACID AND PREPARATION THEREOF

Robert Duschinsky, 11 Hawthorne Road, Essex Fells, N.J., and Charles Heidelberger, % McArdle Memorial Laboratory, University of Wisconsin, Madison, Wis.

No Drawing. Original application Sept. 26, 1956, Ser. No. 612,088, now Patent No. 2,802,005, dated Aug. 6, 1957. Divided and this application May 17, 1957, Ser. No. 659,745

5 Claims. (Cl. 260—260)

This invention relates to novel chemical compounds and to novel processes and novel intermediates useful in preparing the same. More particularly, the invention relates to 5-fluoroorotic acid and salts thereof; to methods of preparing said 5-fluoroorotic acid and salts; and to intermediates useful in practicing said methods.

This application is a division of our copending application Serial No. 612,088, filed September 26, 1956, which issued as Patent No. 2,802,005 on August 6, 1957.

A quick survey of the invention is afforded by the following flow sheets. The symbols employed in the flow sheets have the following meanings:

$R^0A$ represents a lower alkylating agent; preferably a lower alkyl ester of an inorganic mineral acid, such as diethyl sulfate, methyl bromide, ethyl iodide, and the like: in the preferred case, $R^0$ represents a lower alkyl radical and A represents an anionic portion of said mineral acid.

$M^0$ and M each represents an alkali metal, for example potassium or sodium.

$R^1$ and $R^2$ each represents a lower alkyl radical.

R represents a radical selected from the group consisting of lower alkyl and benzyl.

It will be understood that none of the lower alkyl radicals represented by the symbols $R^0$, $R^1$, $R^2$ and R need be identical; but any or all of such radicals can be identical alkyl radicals. Likewise, the alkali metals represented by the symbols $M^0$ and M need not be identical; but such metals can be identical.

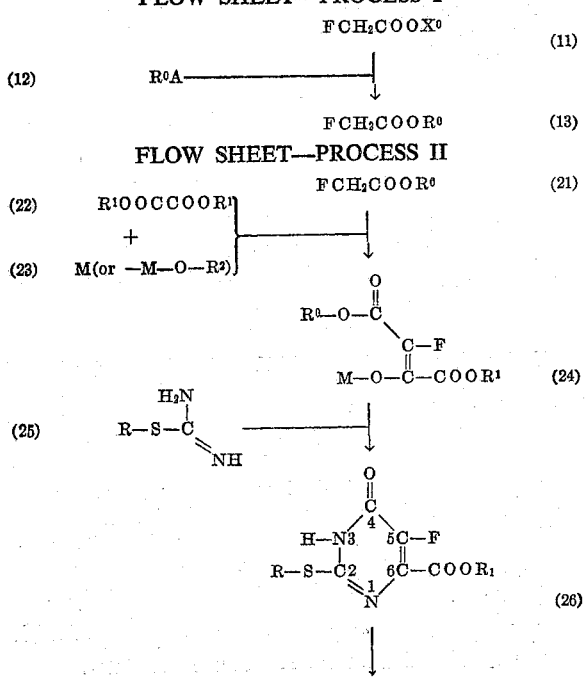

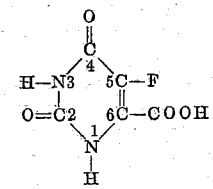

Process I

As will be appreciated from the foregoing flow sheet for Process I, this aspect of the invention provides a process which comprises reacting alkali metal fluoroacetate (11) with lower alkylating agent (12), thereby producing lower alkyl fluoroacetate (13). Preferably the sodium or potassium salt of fluoroacetic acid is used as reactant (11); and preferably diethyl sulfate or dimethyl sulfate or methyl bromide or ethyl chloride or the like is used as the lower alkylating agent (12). The reaction can be effected, for example, by heating the reactants together until completion of the reaction whereby the lower alkyl radical is exchanged for the alkali metal. An inert solvent can be employed, if desired, but its use is not required. The product can be purified, if desired, by conventional means, for example by distillation.

In the following description of the process represented diagrammatically above in the "Flow Sheet—Process II," the reference numeral (21) is employed in lieu of the numeral (13) previously used to designate the lower alkyl fluoroacetate product of Process I.

Process II

As will be appreciated from the foregoing flow sheet for Process II, a comprehensive embodiment of this aspect of the invention provides a process which comprises subjecting lower alkyl fluoroacetate (21) to Claisen condensation with di(lower alkyl) oxalate (22) in the presence of alkali metal-containing condensing agent (23), thereby producing alkali metal enolate of di(lower alkyl) fluorooxalacetate (24); condensing the latter with a member (25) selected from the group consisting of S-(lower alkyl) isothiourea and S-benzylisothiourea, thereby producing the corresponding member (26) selected from the group consisting of S-lower alkyl ether of 2-thio-5-fluoroorotic acid lower alkyl ester and S-benzyl ether of 2-thio-5-fluoroorotic acid lower alkyl ester; and hydrolyzing said corresponding member, thereby producing 5-fluoroorotic acid (27).

The first stage of the comprehensive embodiment of Process II referred to above comprises reacting lower alkyl fluoroacetate in a Claisen condensation with di(lower alkyl) oxalate, in the presence of alkali metal-containing condensing agent. Preferably, ethyl fluoroacetate is employed with diethyl oxalate; or, alternatively, methyl fluoroacetate with dimethyl oxalate. As the alkali metal-containing condensing agent, preferably potassium ethoxide is employed; but, alternatively, potassium methoxide or potassium can be employed. A suitable method of effecting this first stage comprises heating the reactants (21), (22) and (23) together in an anhydrous inert solvent such as ethanol, toluene or diethyl ether, until completion of the condensation. The product, represented by the general formula (24) in the flow sheet for Process II, can be styled alkali metal enolate of di(lower alkyl) fluorooxalacetate; an alternative nomenclature is, alkali metal salt of lower alkyl ester of fluorooxalacetic acid. Particularly when ethyl fluoroacetate is condensed with diethyl oxalate in the presence of potassium ethoxide, the resulting product, diethyl potassiofluorooxalacetate, need not be purified before further reaction in Process II.

The second stage of the comprehensive embodiment of Process II referred to above comprises condensing alkali metal enolate of di(lower alkyl) fluorooxalacetate with S-(lower alkyl)isothiourea or S-benzylisothiourea. Advantageously, the S-(lower alkyl)isothiourea or S-benzylisothiourea is employed in the form of its acid addition salt with a mineral acid, e.g. S-methylisothiouronium sulfate or S-ethylisothiouronium bromide or S-benzylisothiouronium chloride, in the presence of at least the equivalent amount of alkali necessary to neutralize the mineral acid. The reaction is preferably effected by heating the reactants together in an anhydrous inert solvent, such as methanol or ethanol, until the condensation reaction has been completed. It is recommended to use freshly prepared alkali metal enolate reactant (24). The product (26), i.e. S-lower alkyl ether of 2-thio-5-fluoroorotic acid lower alkyl ester or S-benzyl ether of 2-thio-5-fluoroorotic acid lower alkyl ester, can be purified by conventional means, e.g. by recrystallization from inert solvents.

The third stage of the comprehensive embodiment of Process II comprises hydrolyzing the S-lower alkyl (or S-benzyl) ether of 2-thio-5-fluoroorotic acid lower alkyl ester. The hydrolysis can be conveniently effected by conventional means, for example by heating the reactant (26) with an aqueous solution of a mineral acid, e.g. with concentrated aqueous hydrochloric acid; alternatively, the reactant (26) can be saponified, e.g. by treating with an aqueous solution of a strong alkali such as aqueous KOH, followed by acid hydrolysis of the resulting solution of the alkali salt of S-lower alkyl (or S-benzyl) ether of 2-thio-5-fluoroorotic acid, e.g. by means of concentrated aqueous hydrochloric or hydrobromic acid. The 5-fluoroorotic acid (27) obtained as product can be purified by conventional means, for example by recrystallization from water or from an inert organic solvent.

One preferred embodiment of the overall Process II shown in the flow sheet comprises condensing ethyl fluoroacetate with diethyl oxalate in the presence of potassium ethoxide, thereby producing potassium enolate of diethyl fluorooxalacetate; condensing the latter with S-ethylisothiourea, thereby producing S-ethyl ether of 2-thio-5-fluoroorotic acid ethyl ester; and refluxing the latter with concentrated aqueous hydrochloric acid, thereby producing 5-fluoroorotic acid. In an alternative preferred embodiment, S-methylisothiourea is used in lieu of S-ethylisothiourea, S-methyl ether of 2-thio-5-fluoroorotic acid ethyl ester being thereby produced in lieu of S-ethyl ether of 2-thio-5-fluoroorotic acid ethyl ester.

It will be appreciated that the compounds represented in the foregoing flow sheets by the formulas (26) and (27); and sometimes referred to in this specification, respectively, as S-lower alkyl ether of 2-thio-5-fluoroorotic acid lower alkyl ester (or species thereof), and S-benzyl ether of 2-thio-5-fluoroorotic acid lower alkyl ester (os species thio-5-fluoroorotic acid lower alkyl ester (or species thereof),
and 5-fluoroorotic acid;

can exist in tautomeric forms, resulting from the shifting of a proton between a nitrogen atom and an oxygen atom. The invention includes all of the tautomeric forms of said compounds.

The compound referred to herein as 5-fluoroorotic acid exhibits acidic properties, and forms salts with bases. The invention includes salts obtained by reacting 5-fluoroorotic acid with medicinally acceptable bases, e.g. alkali metal hydroxides, alkaline earth metal hydroxides, ammonia, non-toxic organic bases such as ethanolamine, and the like.

5-fluoroorotic acid is useful as an antimetabolite, being active to inhibit the growth of *L. leichmannii, L. casei* and *S. faecalis*, for example. It is also active as a germicidal agent, against *Pseudomonas aeruginosa* and similar gram-negative organisms.

The invention is further disclosed in the following examples, which are illustrative but limitative thereof. Temperatures are stated in degrees centigrade, corrected.

EXAMPLE 1

A mixture of 200 g. (2 mols) of dry sodium fluoroacetate and 442 g. (2.86 mols) of diethyl sulfate was refluxed for three and one-half hours in an oil bath. The reaction mixture was then distilled through a fractionating column, yielding 177.3 g. of crude ethyl fluoroacetate, having a boiling range of 116°–120°. The material was redistilled through a fractionating column, yielding purified ethyl fluoroacetate boiling at 114°–118°.

EXAMPLE 2

A potassium ethoxide solution in toluene was prepared from 47.6 g. (1.214 mols) of potassium, 880 ml. of toluene and 190 ml. of ethanol, 300 ml. of toluene-ethanol mixture being distilled off after complete dissolution of the potassium. To the ice-cold solution, from which potassium ethoxide began to crystallize, there was added, under nitrogen, 355 g. (328 ml., 2.428 mols) of diethyl oxalate. A clear yellow solution resulted. While cooling and stirring, 135 g. (1.214 mols) of ethyl fluoroacetate was added dropwise during one and one-half hours. Stirring and cooling were continued for one hour, then the crystallizing mixture was allowed to stand at room temperature overnight. The readily settling colorless crystals were filtered, washed with diethyl ether and dried in vacuo, yielding potassium enolate of diethyl fluorooxalacetate (alternative nomenclature, diethyl potassio-fluorooxalacetate).

EXAMPLE 3

Under nitrogen, to a solution of 6.8 g. (0.295 mol) of sodium in 750 ml. of ethanol there was added 72.5 g. (0.295 mol) of the potassium enolate of diethyl fluorooxalacetate and 54.6 g. (0.295 mol) of S-ethylisothiouronium bromide. Almost complete dissolution was observed, followed by crystallization. The mixture was refluxed under nitrogen while stirring for two hours, and then was evaporated to dryness in vacuo. The residue was dissolved in 200 ml. of ice-cold water, the solution obtained was clarified by filtration through charcoal and extraction of some oil by two portions of diethyl ether, each containing 50 ml. The aqueous layer was cooled in ice and acidified to pH 2 by addition of 50 ml. of dilute aqueous hydrochloric acid (19% by weight HCl). The crystallized material was filtered, washed chlorine-free with water and dried at 100°, yielding S-ethyl ether of 2-thio-5-fluoroorotic acid ethyl ester (alternative nomenclature: 2-ethylmercapto-4-hydroxy-5-fluoro-6-pyrimidinecarboxylic acid ethyl ester), M.P. 166°–167°. Recrystallization of the product from toluene while cooling to −20° yielded purer material having M.P. 167°–168°. For analysis, 0.74 g. of the latter material was again recrystallized from 10 ml. of toluene to yield 0.7 g., M.P. 168°–169°.

EXAMPLE 4

Under nitrogren, 4 g. (0.0162 mol) of S-ethyl ether of 2-thio-5-fluoroorotic acid ethyl ester, M.P. 166°–167°, was refluxed in 70 ml. of concentrated aqueous hydrochloric acid (containing 37% by weight HCl) for four hours. The mixture was cooled in ice and the crystallized acid was filtered, washed chlorine-free with water and dried at 100°. There was thus obtained 5-fluoroorotic acid monohydrate. The compound retained its water of crystallization very tenaciously. The acid melted with decarboxylation at 255°; the residue, which was 5-fluorouracil, solidified and then melted at 278°–279°. For analysis, a sample of 5-fluoroorotic acid monohydrate was recrystallized from ca. 35 volumes of water.

A sample of 5-fluoroorotic acid monohydrate was sublimed in vacuo at 260°–270° (bath temperature) and 0.1 mm., yielding the anhydrous acid, which melted with decarboxylation and resolidification like the monohydrate.

The 5-fluoroorotic acid (in both the anhydrous and the monohydrate forms) thus obtained was an acidic material. Upon reaction with bases, it formed salts. Thus, it dissolved in aqueous sodium hydroxide and potassium hydroxide solutions, forming sodium and potassium salts, respectively.

EXAMPLE 5

A mixture of 100 g. (0.41 mol) of diethyl potassio-fluorooxalacetate, 57.2 g. (0.21 mol) of S-methylisothiouronium sulfate and a solution of 44.3 g. (0.82 mol) of sodium methoxide in 1100 ml. of methanol was refluxed under nitrogen and worked up as described in Example 3 above for the ethylmercapto ester. In this case, transesterification took place and S-methyl ether of 2-thio-5-fluoroorotic acid methyl ester was obtained; M.P. 195°–197°. For analysis, a sample was recrystallized from 60 volumes of toluene: M.P. 199°–201°.

EXAMPLE 6

A solution of 1.84 g. (0.08 mol) of sodium in 150 ml. of ethanol, 8.25 g. (0.04 mol) of diethyl potassio-fluorooxalacetate and 5.57 g. (0.02 mol) of S-methylisothiouronium sulfate was refluxed for two hours and worked up as described in Example 3 above, yielding S-methyl ether of 2-thio-5-fluoroorotic acid ethyl ester, M.P. 177°–178°. For analysis, the compound was recrystallized from 25 volumes of toluene: M.P. 183°–184°.

We claim:
1. A compound selected from the group consisting of 5-fluoroorotic acid and salts thereof with medicinally acceptable bases.
2. 5-fluoroorotic acid.
3. A process of making S-lower alkyl ether of 2-thio-5-fluoroorotic acid lower alkyl ester which comprises condensing freshly prepared alkali metal enolate of di(lower alkyl) fluorooxalacetate under anhydrous conditions with S-(lower alkyl)isothiourea.
4. A process of making S-benzyl ether of 2-thio-5-fluoroorotic acid lower alkyl ester which comprises condensing freshly prepared alkali metal enolate of di(lower alkyl) fluorooxalacetate under anhydrous conditions with S-benzylisothiourea.
5. An alkali metal salt of 5-fluoroorotic acid.

References Cited in the file of this patent

UNITED STATES PATENTS

| | | |
|---|---|---|
| 2,666,764 | Lanzilotti et al. | Jan. 19, 1954 |
| 2,802,005 | Heidelberger | Aug. 6, 1957 |

OTHER REFERENCES

Johnson: Jour. Am. Chem. Soc., vol. 65, pp. 1218–19 (1943).

Johnson: Jour. Am. Chem. Soc., vol. 66, pp. 146–148 (1944).

Vanderhaeghe, Bull. Soc. Chem., Belg., vol. 62, pp. 611–618 (1953).

UNITED STATES PATENT OFFICE

CERTIFICATE OF CORRECTION

Patent No. 2,948,725                         August 9, 1960

Robert Duschinsky et al.

It is hereby certified that error appears in the printed specification of the above numbered patent requiring correction and that the said Letters Patent should read as corrected below.

Column 1, line 39, for "smybols" read -- symbols --; line 46, under heading, "FLOW SHEET-PROCESS I", for "$FCH_2COOX°$" read -- $FCH_2COOM°$ --; line 55, under heading, "FLOW SHEET-PROCESS II", for "$M(or-M-O-R^2)$" read -- $M(or\ M-O-R^2)$ --; line 68, same FLOW-- SHEET II" for "$-COOR_1$" read -- $-COOR^1$ --; column 3, line 58, strik out "thio-5-fluoroorotic acid lower alkyl ester (os species"; line 74, for "5-fluoroorotic" read -- 5-Fluoroorotic --; column 4, line 5, for "but limitative" read -- but not limitative --.

(SEAL)          Signed and sealed this 25th day of April 1961.

Attest:

ERNEST W. SWIDER                                 DAVID L. LADD
Attesting Officer                                     Commissioner of Patents